United States Patent [19]

Scheckel et al.

[11] Patent Number: 5,349,173

[45] Date of Patent: Sep. 20, 1994

[54] APPARATUS FOR CONTACTLESS DATA AND ENERGY TRANSMISSION

[75] Inventors: Bruno Scheckel, Ebersberg; Robert Reiner, Unterhaching, both of Fed. Rep. of Germany

[73] Assignee: Siemens Aktiengesellschaft, Munich, Fed. Rep. of Germany

[21] Appl. No.: 872,825

[22] Filed: Apr. 23, 1992

[30] Foreign Application Priority Data

Apr. 23, 1991 [EP] European Pat. Off. ........ 91106526.6

[51] Int. Cl.$^5$ .............................................. G06K 19/06
[52] U.S. Cl. .................... 235/492; 235/449; 365/229
[58] Field of Search ................. 235/492, 449; 365/229

[56] References Cited

U.S. PATENT DOCUMENTS

| | | | |
|---|---|---|---|
| 4,146,781 | 3/1979 | Machate | 235/492 |
| 4,546,241 | 3/1989 | Walton | 235/492 |
| 4,785,166 | 11/1988 | Kushima | 235/492 |
| 4,791,285 | 12/1988 | Ohki | 235/492 |
| 4,818,855 | 4/1989 | Mongeon et al. | 235/492 |
| 4,906,828 | 3/1990 | Halpern | 235/492 |
| 4,924,171 | 5/1990 | Baba et al. | 323/347 |
| 5,055,659 | 10/1991 | Hendrick et al. | 235/492 |
| 5,138,142 | 8/1992 | Sanemitsu | 235/492 |
| 5,191,192 | 3/1993 | Takahira et al. | 235/492 |
| 5,212,373 | 5/1993 | Fujioka et al. | 235/492 |
| 5,212,664 | 5/1993 | Shinohara | 365/229 |
| 5,241,160 | 8/1993 | Bashan et al. | 235/492 |

FOREIGN PATENT DOCUMENTS

| | | |
|---|---|---|
| 0309201 | 3/1989 | European Pat. Off. . |
| 0466949 | 1/1992 | European Pat. Off. . |
| 3412610 | 10/1985 | Fed. Rep. of Germany . |
| 62-297988 | 12/1987 | Japan ................................. 235/492 |

*Primary Examiner*—Raymond A. Neilli
*Attorney, Agent, or Firm*—Herbert L. Lerner; Laurence A. Greenberg

[57] ABSTRACT

An apparatus for contactless data and energy transmission includes a stationary part having at least one coil for data and energy transmission, and an oscillator connected to the at least one coil for energy transmission. A movable part has at least one coil for data and energy transmission, at least one rectifier device connected downstream of the at least one coil, and at least one charge capacitor connected to the at least one rectifier device for carrying a pulsating operating voltage. One pair of the coils is used for energy transmission and one pair of the coils is used for data transmission. The coils of the movable part are arbitrarily associated with the coils of the stationary part. A device is disposed in the movable part for transmitting data from the movable part to the stationary part, by returning a portion of energy received through an applicable one of the coils of the movable part, modulated in accordance with a data signal, through another of the coils of the movable part.

15 Claims, 3 Drawing Sheets

APPARATUS FOR CONTACTLESS DATA AND ENERGY TRANSMISSION

The invention relates to an apparatus for contactless data and energy transmission, including a stationary part, a movable part, at least one coil respectively associated with each of the movable part and the stationary part for data and energy transmission; one pair of coils being used for energy transmission and one pair of coils being used for data transmission; the coils of the movable part being arbitrarily associated with the coils of the stationary part; an oscillator in the stationary part for energy transmission; each coil in the movable part being followed by a respective rectifier means; and the rectifier means being connected to a charge capacitor carrying a pulsating operating voltage.

Such an apparatus is described in Published European Application No. 0 466 949 A1, corresponding to U.S. application Ser. No. 590,088, filed Sep. 28, 1990, and in particular in FIGS. 1 and 2 and the description thereof.

The European Application mentioned above shows an apparatus for contactless data and energy transmission, including a stationary part (ST) having an oscillator (OSC) for contactless power transmission with the aid of a pair of coils (L1a, L2a; L1b, L2b) to a movable part (BT), wherein the oscillation of the oscillator (OSC) is split into a reference oscillation and an information oscillation, and a phase displacement with respect to the reference oscillation is forced upon the information oscillation as a function of the data (DT1) to be transmitted, the phase-displaced oscillation is delivered to the movable part (BT) through a first pair of coils (L1b, L2b and L1a, L2a, respectively) and the oscillation voltage is delivered to the movable part (BT) through a respective second pair of coils (L1a, L2a) or (L1b, L2b), wherein in the movable part (BT) the transmitted oscillations are delivered to a demodulator circuit (DEMOD), which recovers the data from the phase displacement, and wherein a data transmission from the movable part (BT) to the stationary part (ST) takes place by means of load variation. The power transmission is accomplished with only the aid of a pair of coils, and the data transmission from the movable part to the stationary part is accomplished only by load variation at the coil of the movable part that is not used for power transmission.

In order to assure that the coils of the stationary part can be associated arbitrarily with coils of the movable part to form pairs of coils and thus to assure that energy or data can be transmitted through each of the two coils, even if not simultaneously, each of the two coils of the movable part is associated not only with a rectifier circuit but also at least with the final control element of a voltage regulator and moreover with at least one switch, which is capable of varying the load on the pair of coils associated with it as a function of its triggering and the resultant switch position. It is also possible for each of the coils to be associated with one voltage regulator and one variable load. In all such cases, it must be assured by means of a logical linkage that the amplitude modulator required for the data transmission from the movable part to the stationary part always varies the load of the pair of coils that has no part in the energy transmission, and has a voltage regulator or voltage regulator final control element that is consequently not activatable, or which does not have the voltage regulator connected to its output side.

If the coils of the movable part and the coils of the stationary part are intended to be arbitrarily couplable and therefore a demodulator circuit having a circuit unit for fixing the logic level of the signal is provided, then in the same way as it fixes the logic level, the circuit unit can also recognize which of the coils of the movable part the reference oscillation is to be transmitted to and which of the coils of the movable part the information oscillation, which is variable in its phase relationship with the reference oscillation, is transmitted to. In such an apparatus for contactless data and energy transmission, as a function of a demodulator circuit signal containing the information, a logic linkage fixes which coil of the movable part is used for data transmission from the movable part to the stationary part and which coil is used for the energy transmission, which assures that the data transmission from the movable part to the stationary part is performed with the aid of the coil of the movable part that at that moment is not being used for energy transmission. In order to assure a continuous energy supply to the movable part, the coil transmitting the reference oscillation is followed by a voltage regulator, or activates a voltage regulator connected to the output side of the coil, and at the coil of the movable part that transmits the information oscillation, the data transmission from the movable part to the stationary part varies the load as a function of the data to be transmitted.

The advantage of the above-described configuration is that the apparatus can control the data transmission in full duplexing. However, the disadvantage of that configuration is a correspondingly high expense for circuitry. Since such devices are used primarily in chip cards, which are also called "smart cards" and chip keys, full duplex capacity is not necessary. In those applications, simultaneous transmission of data from the movable part and the stationary part occurs only very infrequently so that full duplexing capability can be dispensed with without major time losses when such an apparatus is used.

It is accordingly an object of the invention to provide an apparatus for contactless data and energy transmission, which overcomes the hereinafore-mentioned disadvantages of the heretofore-known devices of this general type and which enables the simplest possible configuration to be used for carrying out the data transmission from the movable part to the stationary part.

With the foregoing and other objects in view there is provided, in accordance with the invention, an apparatus for contactless data and energy transmission, comprising a stationary part having at least one coil for data and energy transmission, and an oscillator connected to the at least one coil for energy transmission; a movable part having at least one coil for data and energy transmission, at least one rectifier means connected downstream of the at least one coil, and at least one charge capacitor connected to the at least one rectifier means for carrying a pulsating operating voltage; one pair of the coils being used for energy transmission and one pair of the coils being used for data transmission; the coils of the movable part being arbitrarily associated with the coils of the stationary part; and means disposed in the movable part for transmitting data from the movable part to the stationary part, by returning a portion of energy received through an applicable one of the coils of the movable part, modulated in accordance with a data signal, through another of the coils of the movable part.

In accordance with another feature of the invention, the movable part includes at least one controllable semiconductor component having a load path interconnecting the coil for energy transmission and the coil for data transmission and having a control input receiving the data signal to be transmitted.

In accordance with a further feature of the invention, the at least one controllable semiconductor component includes at least two controllable semiconductor components each being connected between a respective terminal of the coil for energy transmission and a respective terminal of the coil for data transmission.

In accordance with an added feature of the invention, there is provided at least one resistor connected in series with the load path of the at least one controllable semiconductor component.

In accordance with an additional feature of the invention, the load paths of the at least two semiconductor components have a high impedance.

In accordance with yet another feature of the invention, there is provided at least one modulator associated with the at least one coil in the movable part for delivering a rectified operating voltage being modulated with an energy signal blanked out of the data signal, to the at least one coil in the movable part for data transmission.

In accordance with yet a further feature of the invention, the at least one rectifier means include two series-connected diodes having interconnected cathodes with a node point therebetween; first and second MOS transistors having load paths connected in a series connection with a node point therebetween, the series connection of the MOS transistors being connected parallel to the series-connected diodes; and the series connection of the MOS transistors having a first terminal connected to the first MOS transistor and a second terminal connected to the second MOS transistor, the first MOS transistor having a gate terminal connected to the second terminal and the second MOS transistor having a gate terminal connected to the first terminal; the node points being connected to the at least one charge capacitor carrying the operating voltage; and the at least one modulator includes an OR gate having a first input receiving the data signal, a second input receiving the energy signal decoupled from the energy transmission coil, and an output; and an MOS transistor having a control input connected to the output of the OR gate and a load path connected parallel to one of the two diodes of the rectifier means.

In accordance with yet a further feature of the invention, the at least one rectifier means has at least one output, and there is provided an MOS transistor having a load path connected between the at least one charge capacitor and the at least one output of the at least one rectifier means.

In accordance with yet an added feature of the invention, the at least one rectifier means has inputs and outputs; and the at least one modulator includes: four semiconductor switching elements having load paths and control terminals; the load paths of two of the four semiconductor switching elements being connected in a first series circuit having a node point between the semiconductor switching elements and having terminals, and the load paths of the other two of the four semiconductor switching elements being connected in a second series circuit having a node point between the semiconductor switching elements and having terminals; each of the node points of the series circuits being connected to a respective one of the inputs of the rectifier means; resistors each being connected between a respective one of the outputs of the rectifier means and a respective one of the terminals of the series circuits; a non-inverted control signal and an inverted control signal being delivered in alternation to the control terminals of the semiconductor switching elements of the first series circuit, the inverted control signal and the non-inverted control signal being delivered to the control terminals of the semiconductor switching elements of the second series circuit, and the coil for data transmission being acted upon in alternation with a positive and a negative voltage at the at least one charge capacitor.

In accordance with yet an additional feature of the invention, the at least one rectifier means has inputs and outputs; and the at least one modulator includes: four semiconductor switching elements having control terminals; two of the four semiconductor switching elements being connected in a first series circuit having a node point between the two semiconductor switching elements and having terminals, and the other two of the four semiconductor switching elements being connected in a second series circuit having a node point between the other two semiconductor switching elements and having terminals; two capacitors each being connected between a respective one of the node points of the series circuits and a respective one of the inputs of the rectifier means; one of the terminals of each of the series circuits being connected to a respective one of the outputs of the rectifier means; a non-inverted control signal and an inverted control signal being delivered in alternation to the control terminals of the semiconductor switching elements of the first series circuit, the inverted control signal and the non-inverted control signal being delivered to the control terminals of the semiconductor switching elements of the second series circuit, and the coil for data transmission being acted upon in alternation with a positive and a negative voltage at the at least one charge capacitor.

In accordance with a concomitant feature of the invention, the at least one rectifier means has first and second inputs and first and second outputs; and the at least one modulator includes: first and second reversing switched semiconductor switching elements having load paths and first and second reversing switch terminals; capacitors each being connected between the first output of the rectifier means and the load path of a respective one of the semiconductor switching elements; each of the first reversing switch terminals of the semiconductor switching elements being connected to the input of a respective one of the rectifier means, and the second reversing switch terminals of each of the semiconductor switching elements being connected to the second output of the rectifier means; a third reversing switch semiconductor switching element having reversing terminals, a neutral middle position, and a load path; the load path of the third semiconductor switching element being connected to the first output of the rectifier means; and the reversing terminals of the third semiconductor switching element each being connected to a respective one of the inputs of the rectifier means.

One advantage of the invention is that by making a restriction to the half duplexing transmission process, the modulator-demodulator circuits in both the stationary and the movable parts can be constructed considerably more simply. As a result, both parts are simpler to integrate. The modulation process makes it possible to operate the information transmitter with only a fraction of the energy of the power transmitter, which leads to an advantageous balance of power in the movable part.

Other features which are considered as characteristic for the invention are set forth in the appended claims.

Although the invention is illustrated and described herein as embodied in an apparatus for contactless data and energy transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
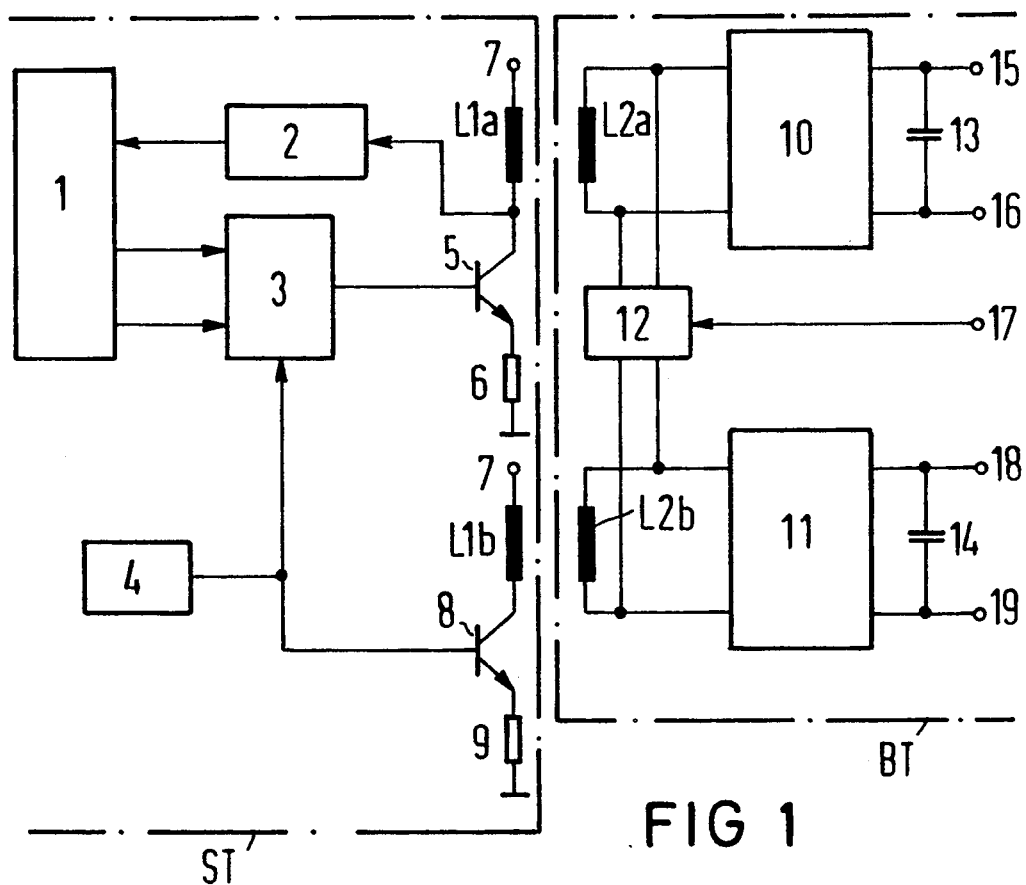
FIG. 1 is a schematic and block circuit diagram of a configuration according to the invention, having a stationary part and a movable part.

Referring now to the figures of the drawing in detail and first, particularly, to FIG. 1 thereof, there is seen a basic layout of an apparatus according to the invention for contactless data and energy transmission. The drawing shows a stationary part ST in fragmentary form, with a control logic 1 that is capable of generating various control signals which are delivered to a modulator 3 having an output that is connected to the control input of a first transistor 5. The load path of the transistor 5 is connected in series with a first transmission coil L1a and a first resistor 6 between an operating voltage terminal 7 and ground. A signal that is delivered to a demodulator 2 is derived at a node point between the transmission coil L1a and the load path of the transistor 5. The demodulator 2 is in turn connected to the control logic 1. An oscillator 4 is also provided for generating energy. An output signal of the oscillator 4 is delivered both to the modulator 3 and to the base terminal of a second control transistor 8. The load path of the transistor 8 is also connected in series with the second coil L1b and a second resistor 9, between the operating voltage terminal 7 and ground, During the operation of the apparatus, first and second receiver coils L2a and L2b which are located in a movable part BT, are opposite the coils L1a, L1b located in the stationary part. Rectifier units 10, 11 each follow a respective one of the coils L2a, L2b. A modulator unit 12 which is provided has four terminals, each being connected to a different terminal of the two coils. A control input is also provided at the modulator unit 12. Each rectifier unit or means 10, 11 has two respective outputs 15, 16 and 18, 19, with which one respective charge capacitor 13, 14 is associated. However, the outputs of the rectifier means may also be connected in parallel, in which case only one charge capacitor is needed. For the sake of simplicity, subsequent circuit elements, such as demodulators, voltage regulators and processors and memory units, are not shown.

The receiver coil L2b may also serve as an energy transmission coil and the receiver coil L2a may also serve as a data transmission coil. The modulator unit 12 makes it directly possible to switch some of the energy from the energy transmission coil L2b to the data transmission coil L2a. An energy transmission signal is then blanked out of a data signal present at a terminal 17. The advantage of this configuration is that it requires no unit that recognizes which of the two coils is functioning as an energy transmission coil and which is functioning as a data transmission coil, because for data transmission, some of the energy is simply returned through the other respective coil. The merely slight coupling between the modulation process and the energy supply assures that any voltage fluctuation during the modulation will be relatively slight.

Figure 2:
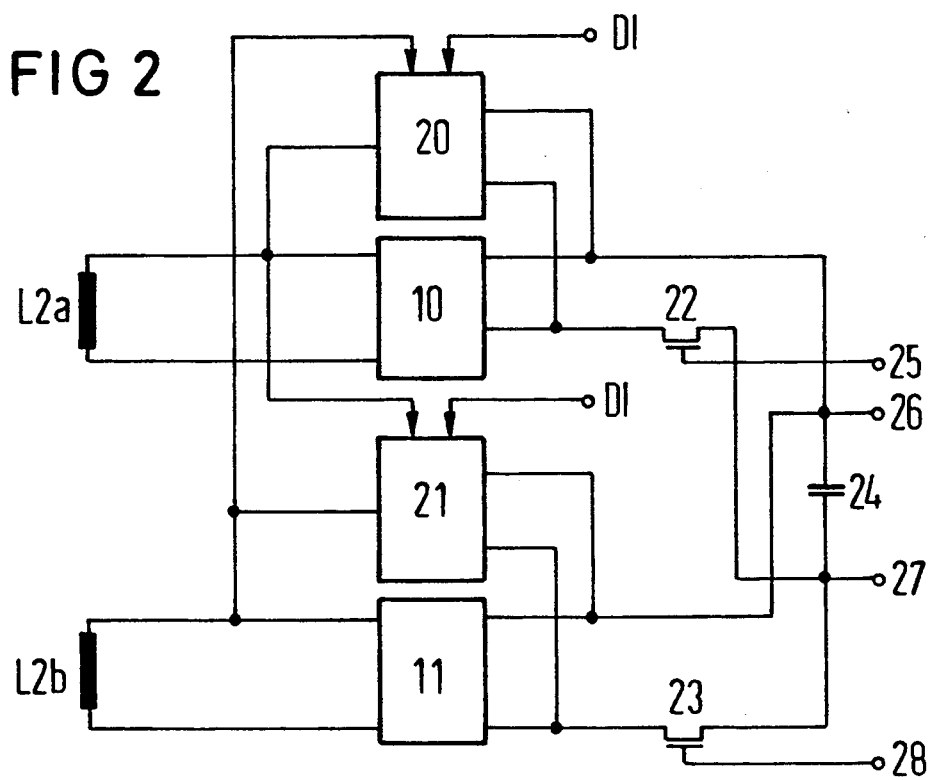
FIG. 2 is a schematic and block circuit diagram of a further configuration of the movable part according to the invention.

FIG. 2 shows another embodiment of a half-duplex-capable data transmission unit in the movable part BT. Once again, the coils L2a and L2b that are necessary for energy transmission and data transmission are shown. The stationary part is no longer shown but corresponds to that shown in FIG. 1. Each coil is again followed by a rectifier unit or means 10, 11, and each rectifier means has a modulator unit 20, 21 connected parallel to it, so that inputs of the modulators 20, 21 are connected to outputs of the rectifier means 10, 11, and output signals of the modulators 20, 21 are delivered to the coils. A first output of each rectifier means 10, 11 is connected directly to one terminal of a charge capacitor 24. A second output of each of the rectifier means 10, 11 is connected through the load path of a respective switching transistor 22, 23 to the other terminal of the charge capacitor 24. These transistors 22, 23 serve to turn off whichever part of the unit furnishing the supply voltage is not involved in the energy transmission. The terminals of the charge capacitor 24 lead to respective terminals 26 and 27, at which a pulsating direct voltage can be picked up. Terminals 25 and 28 lead to the control terminals of the switching transistors 22 and 23. In each case, a data signal is delivered to the modulators 20, 21 through a connection DI. Finally, the signal of each coil is delivered to the modulator associated with the other respective coil. A unit for recognizing the data transmission coil and the energy transmission coil and for generating the corresponding signals for the switching transistors 22, 23 is not shown.

For instance, a carrier oscillation generated by the oscillator 4 in the stationary part may be delivered to the energy transmission coil L2b in the movable part BT. During an initializing time, the carrier oscillation in the modulator of the stationary part is suppressed. This is performed by means of a non-illustrated control line of the control logic 1 shown in FIG. 1. Therefore in the movable part, only those of the demodulators that are not shown in the drawing figures carry potential in the energy-carrying branch. This information is stored in the form of coil position information in memory in the control logic of the movable part, which is also not shown. After the initializing time has elapsed, the stationary part can transmit data to the movable part. For instance, this may be performed in such a way that the modulator in the stationary part blanks out the carrier oscillation of the oscillator 4. In the movable part, the rectified, smoothed carrier oscillation can be picked up as a data signal at the non-illustrated demodulator that follows the rectifier means 10, 11, of the part that is used for data transmission.

In the ensuing description it is assumed that the coil L2b is used for energy transmission and the coil L2a for data transmission. The switchover of the data direction is performed in both subsystems by an intelligent control logic. It can block the modulator in the stationary part ST through one of the control signals. In the movable part BT, in order to receive data, the rectifier means as well as the following demodulator and the modulator are uncoupled from the energy-carrying part by means of the switching transistor 22. In order to provide for transmission from the movable part BT to the stationary part ST, the carrier oscillation is blanked out in the movable part BT at the energy coil L2b and delivered to the modulator 20 of the data branch. A data stream present at the connection DI blanks out the carrier oscillation. The necessary transistor energy is then drawn as partial energy, through the switching transistor 22 (or 23), from the charge capacitor 24, which is constantly charged through the rectifier bridge 11 of the energy branch. The received data signal is available at the output of the demodulator 2 in the stationary part ST, which may, for instance, include a rectifier and a smoothing capacitor.

The smoothed direct voltage at the charge capacitor 24 can be further processed in regulators located downstream, to make a stabilized voltage in order to supply the other circuit elements, such as processors and memories, which are necessary for the operation of a chip card or chip key.

Figure 3:
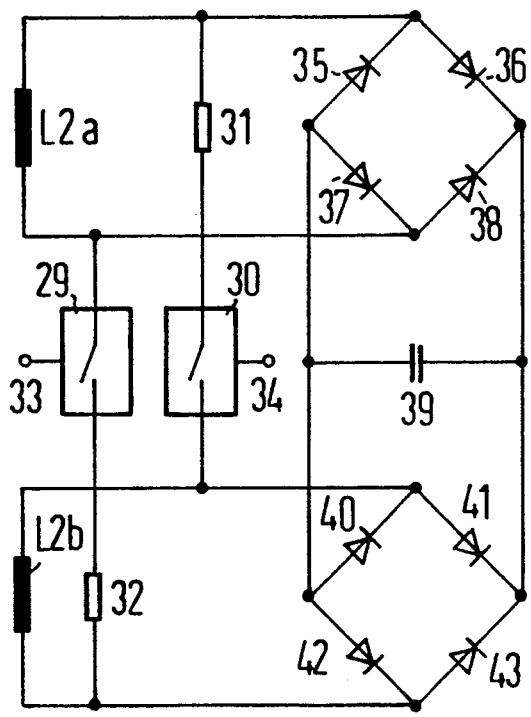
FIG. 3 is a schematic and block circuit diagram of first embodiment of the configuration of FIG. 1 according to the invention.

FIG. 3 shows a first embodiment of the basic configuration according to the invention shown in FIG. 1. Once again, only those circuit elements that are necessary for data transmission from the movable part BT to the stationary part ST are shown. Thus the first coil L2a in the movable part is shown, with a rectifier unit including a first bridge rectifier having diodes 35-38 with an output connected to the charge capacitor 39. The second coil L2b is likewise coupled to a second bridge rectifier including diodes 40–43 with an output that is likewise connected to the charge capacitor 39. The data transmission is enabled by two semiconductor switch elements 29, 30. The two coils are connected in parallel with one another through these switch elements. Connected in series with each of the semiconductor switch elements 29 and 30 is a respective resistor 31, 32. The control inputs of the semiconductor switch elements are shown at reference numerals 33 and 34.

The applicable data signal, which is intended to be transmitted from the movable part to the stationary part, is present at the control inputs 33 and 34. As a result, some of the energy received by one coil, L2a or L2b, is transmitted directly to the other coil. The resistors 31 and 32 may also be provided in the load paths of the semiconductor switch elements 29, 30. A particularly simple version of the configuration shown in FIG. 3 can be attained by using only one semiconductor switch element. In that case, the other terminal of the coil is hard-wired to the other respective terminal of the second coil. In FIG. 3, no demodulator circuits are shown, once again for the sake of simplicity. They would have to follow or precede the respective rectifier means 35 through 38; 40 through 43. The non-illustrated outputs of the two demodulator circuits could then be joined together again.

Figure 4:
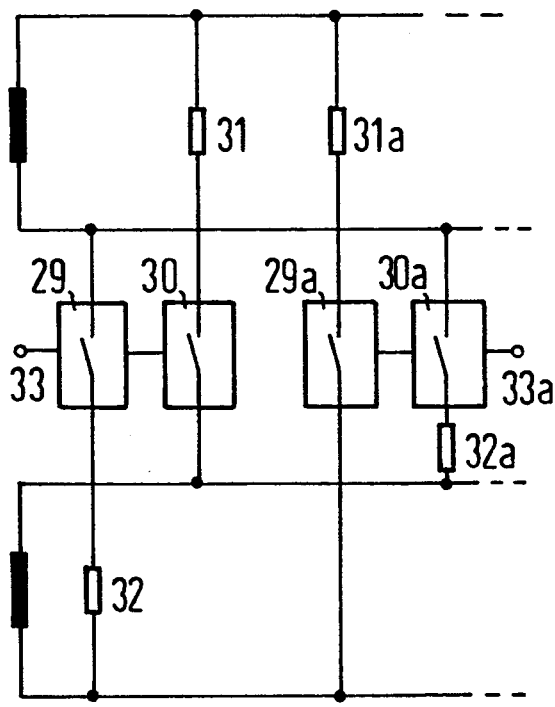
FIG. 4 is a schematic and block circuit diagram of second embodiment of the configuration of FIG. 1 according to the invention.

FIG. 4 shows a second embodiment in accordance with the basic circuit diagram of FIG. 1. As compared with that shown in FIG. 3, the circuit has been expanded by two semiconductor switch elements 29a, 30a. The additional semiconductor switch elements connect the terminals of the two coils L2a and L2b to one another in such a way that the terminals of the first coil L2a are connected to the respective other terminals of the second coil L2b. Resistors 31a and 32a are again connected in series with the load paths of the semiconductor switch elements 29a, 30a. These resistors may also be dispensed with, if the applicable signals can be picked up at the resistors 31 and 32. Once again, the resistors may be dispensed with entirely, if the resistors are provided in the load paths of the switching transistors.

Signals that are inverted relative to one another must be present at the control terminal 33a of the two additional switching transistors and at the control terminal 33 of the two switching transistors 29, 30. The signal can then be selected in such a way that a frequency inversion occurs upon data transmission. This makes it possible to avoid coupling together the energy and transmission parts.

Figure 5:
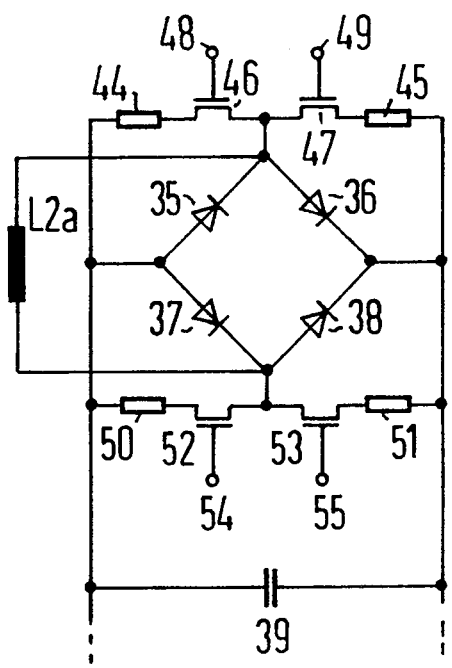
FIG. 5 is a schematic and block circuit diagram of third embodiment of the configuration of FIG. 2 according to the invention.

FIG. 5 shows a first exemplary embodiment of the configuration of FIG. 2 according to the invention. In FIG. 5, only one coil L2a and its associated modulator are shown. The circuit elements belonging to the coil L2b are identical in structure and are therefore not shown, for the sake of simplicity. The coil L2a is connected to a rectifier, including the diodes 35 through 38 of FIG. 3. The output of the rectifier 35 through 38 is again connected to a charge capacitor 39. The load paths of two series-connected semiconductor switching elements 46, 47 and 52, 53 are respectively connected to the inputs of the rectifier. A node point of each series circuit is connected on one hand to one input of the rectifier and on the other hand to one terminal of the coil L2a. Terminals of the series circuits of the load paths of the semiconductor switching elements 46, 47 and 52, 53 are each connected through a respective resistor 44, 45, 50, 51 to the outputs of the rectifier 35 through 38 in such a manner that the load path terminal at the semiconductor switching element 46 and the load path terminal of the semiconductor switching element 52 are connected through the respective resistors 44 and 50 to a first input of the rectifier 35 through 38, and the load path terminals of the transistors 47 and 53 are connected through the resistors 45 and 51 to a second output of the rectifier 35 through 38. The resistors 44, 45 and 50, 51 may also be dispensed with if, for instance, they are provided in the load paths of the semiconductor switching elements. The control inputs of the semiconductor switching elements are connected to terminals 48, 49, 54 and 55. A control signal necessary for the data transmission is present at these inputs.

Modulation is performed as follows: the resistors 44, 45 and 50, 51 limit the energy flow to the signal coil L2a or L2b. In order to transmit a signal to the coil L2a or L2b, the semiconductor switching elements are closed crosswise in pairs in alternation, and the voltage at the coil is periodically reversed in polarity. This is performed, for instance, by making the semiconductor switching elements 47 and 52 conducting in alternation with the semiconductor switching elements 46 and 53. The association of the transmission signal with the data signal can be performed in various ways, for instance by amplitude modulation or phase modulation or by defining a time window within which regions the logical 0 and logical 1 signals are defined.

Figure 6:
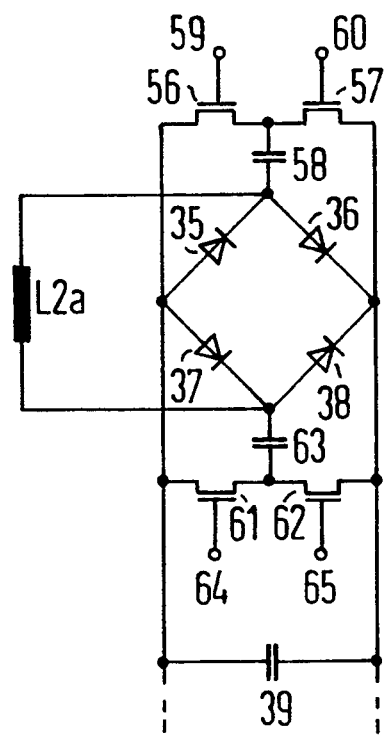
FIG. 6 is a schematic and block circuit diagram of fourth embodiment of the configuration of FIG. 2 according to the invention.

A second embodiment of a configuration of FIG. 2 according to the invention, which is shown in FIG. 6, is made up of a coil L2a, a rectifier 35 through 38, and a charge capacitor 39, as in FIG. 5. Four semiconductor switching elements 56, 57 and 61, 62 are also provided. The load paths of two respective semiconductor switching elements 56, 57 and 61, 62, are again connected in series. A node point of each series circuit 56, 57 and 61, 62 is each connected through a respective capacitor 58, 63 to the inputs of the rectifier 35 through 38. One terminal of each series circuit of semiconductor switching elements 56, 57 and 61, 62 is connected to one output of each of the rectifiers 35 through 38, so that the series circuits of semiconductor switching elements 56, 57 and 61, 62 are connected in parallel to one another. Once again, the semiconductor switching elements 56, 57 and 61, 62 have control terminals 59, 60 and 64, 65.

The two capacitors 58 and 63 are used as reactive impedances. The electrodes of the capacitors are alternatingly located at the positive and negative potential. This is attained by again closing the semiconductor switching elements 57, 61 and 56, 62 crosswise in pairs in alternation. This is performed in accordance with the method described in FIG. 5. For instance, the transistors 57, 61 and the transistors 56, 62 are made conducting in alternation.

Figure 7:
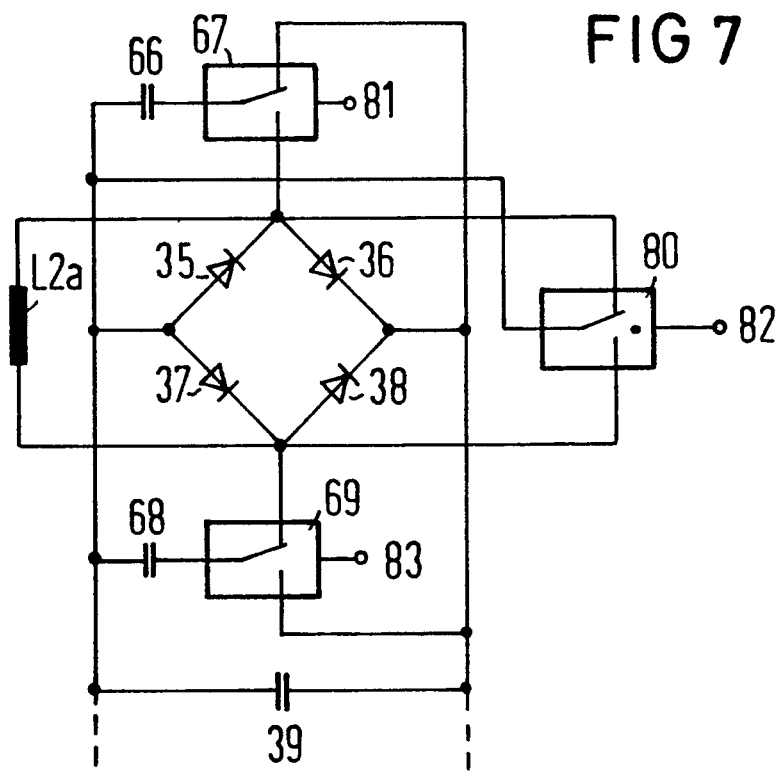
FIG. 7 is a schematic and block circuit diagram of fifth embodiment of the configuration of FIG. 2 according to the invention.

A third embodiment of the configuration of FIG. 2 according to the invention is shown in FIG. 7. Again, the coil L2a, the rectifiers 35 through 38 and the charge capacitor 39 are constructed and connected as shown in FIGS. 5 and 6. First, second and third semiconductor switching elements 67, 69 and 80 are provided and are constructed as reversing switches. Each reversing switch 67, 69 and 80 has first and second reversing switch contacts and one middle contact. Unlike the other reversing switches, the reversing switch 80 must also have a middle position. However, since such reversing switches are typically made with two semiconductor switches, one possibility for the middle position is to block both semiconductor switches. The middle contact of the first reversing switch 67 is connected through a capacitor 66 to the first output of the rectifier 35 through 38. The middle contact of the third reversing switch 80 is connected directly to the first output of the rectifier 35 through 38. The first reversing contact of the first reversing switch 67 and the second reversing contact of the third reversing switch 80 are connected to the first input of the rectifier. In addition, the second reversing contact of the second reversing switch 69 and the first reversing contact of the third reversing switch 80 are connected to the second input of the rectifier 35 through 38. The second reversing contact of the first reversing switch 67 and the first reversing contact of the reversing switch 69 are connected to the second output of the rectifier 35 through 38. Once again, the semiconductor switching elements that are constructed as reversing switches have control terminals 81, 82 and 83.

In this case, the capacitors 66 and 68 are used as so-called "ladle capacitors" as is also known from switched capacitor circuits. They each have one electrode connected to a fixed potential, which further increases their effect in case of unavoidable substrate capacitances upon integration. Control signals are again present at the control terminals 81, 82 and 83, resulting in the following course of operation: the capacitor 66 is charged through the reversing switch 67, while in contrast the capacitor 68 is connected to the coil L2a through the reversing switch 69. The third reversing switch 80 also connects the first output terminal of the rectifier 35 through 38 to the first input of the rectifier 35 through 38, so that the voltage at the capacitor 68 can discharge into the coil L2a. All three reversing switches are thereupon switched over by a suitable control signal, and as a result the capacitor 66 in the coil load circuit can discharge, while the capacitor 68 is charged with the operating voltage that is present at the capacitor 39. The process is then repeated accordingly.

In this way, the capacitors 66 and 68, like small ladles, output a charge in alternating current directions to the coil L2a. By suitably controlling the switches as described above, the most varied transmission methods can be attained.

The semiconductor switching elements shown in FIGS. 3-7 may be constructed in MOS or bipolar technology. If necessary, all of the load paths may be constructed with high impedance. As FIGS. 5, 6 and 7 have already done, FIG. 8 also shows only part of the symmetrically constructed modulator of FIG. 2 according to the invention. Once again, this fourth exemplary embodiment shows the coil L2a, which is connected to the rectifier 10. The rectifier 10 is again constructed as a bridge rectifier, which includes two series-connected diodes 72 and 73, the cathodes of which are connected to one another. Two MOS transistors 70 and 71 which are also provided have load paths that are likewise connected in series.

A series circuit of the load paths of the MOS transistors 70 and 71 is connected parallel to the series circuit of the diodes 72, 73. The parallel-connected terminals of the series circuits represent the input of the rectifier, while node points of the load paths or diode paths represent the output of the rectifier. The control terminals of the MOS transistors 70 and 71 are each connected to the respective terminal of the series circuit of the two MOS transistors 70, 71 that is connected to the load path of the other respective MOS transistor. A further MOS transistor 74, which is part of the modulator, is connected parallel to the first diode 72. The outputs of the rectifier 10 are again connected to a charge capacitor 77 which is in turn connected between two terminals 84, 85. The node point of the series circuit of MOS transistors 70 and 71 of the rectifier is connected to the capacitor 77 through the load path of a further MOS transistor 78. This is precisely equivalent to the configuration shown in FIG. 2. The signal present directly at the coil of one branch is decoupled and delivered to the modulator belonging to the other respective branch.

Figure 8:
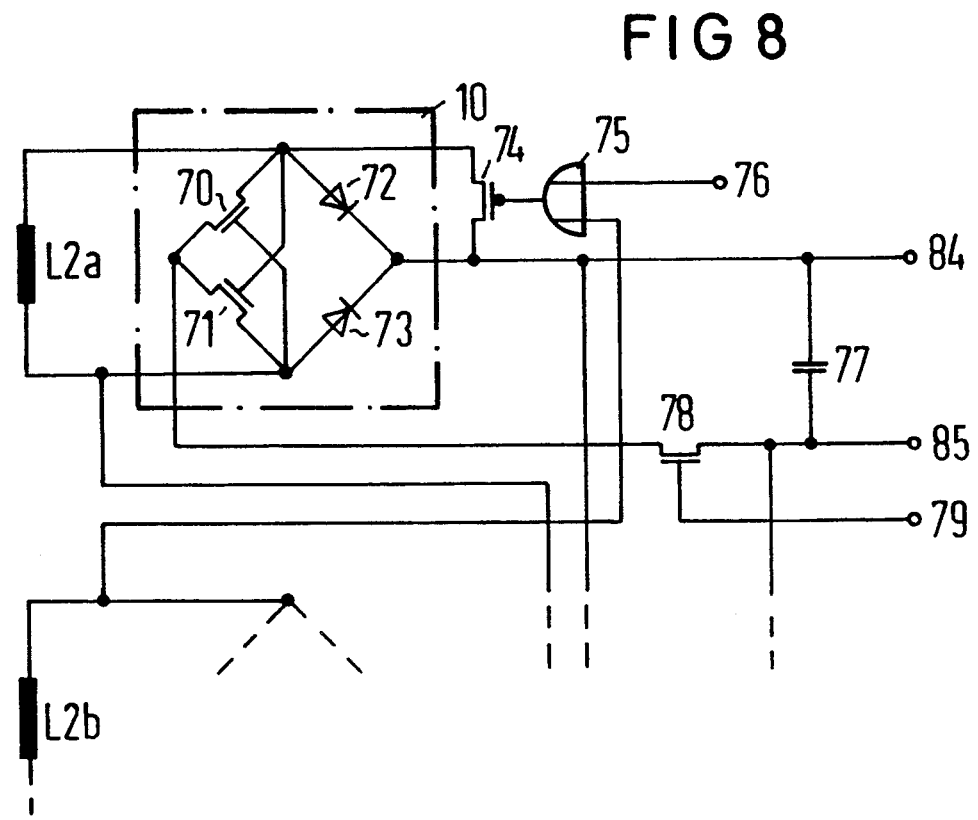
FIG. 8 is a schematic and block circuit diagram of sixth embodiment of the configuration of FIG. 2 according to the invention.

In FIG. 8, decoupling for both coils is shown, while in contrast the connection to the modulator belonging to the coil L2b is not shown in further detail. It is precisely equivalent to the modulator belonging to the coil L2a. The decoupled signal of the coil L2b is delivered in this case to the first input of an OR gate 75. A data signal delivered through a terminal 76 is present at a second input of the OR gate. The output of the OR gate 75 is connected to the control input of the MOS transistor 74.

The oscillation of the energy signal which is, for instance, transmitted through the coil L2b, is blanked out of the data signal that is present at the terminal 76 by the OR gate 75. Once an initializing period has elapsed, the movable part can send the data to the stationary part. In this respect it is again assumed that the energy transmission is effected through the coil L2b and the data transmission through the coil L2a. In order to provide data transmission from the movable part, the transistor 78 is then first made conducting, through a control signal present at a terminal 79. The gate 75 then switches the control transistor 74 in accordance with the data signal present at the terminal 76. This data signal blanks out the signal furnished by the energy transmission coil. If the transistor 74 is in the conducting state, then some of the energy stored in the charge capacitor is delivered to the coil L2a. The current then flows through the switching transistor 74 into the coil L2a and back to the charge capacitor 77 through the MOS transistor 71 and the switching transistor 78.

All of the configurations described above are simple to integrate and in particular can be used in chip cards or in chip keys.

We claim:

1. An apparatus for contactless data and energy transmission, comprising:
   a stationary part having at least one coil for data and energy transmission, and an oscillator connected to said at least one coil for energy transmission;
   a movable part having at least one coil for data and energy transmission, at least one rectifier means connected downstream of said at least one coil, and at least one charge capacitor connected to said at least one rectifier means for carrying a pulsating operating voltage;
   one pair of said coils being used for energy transmission and one pair of said coils being used for data transmission;
   said coils of said movable part being interchangeably operable by a modulator to permit either of said coils of said moveable part to be utilized for one of data and energy transmission; and
   means disposed in said movable part for transmitting data from said movable part to said stationary part, by returning a portion of energy received through an applicable one of said coils of said movable part, modulated in accordance with a data signal, through another of said coils of said movable part.

2. The apparatus according to claim 1, wherein said movable part includes at least one controllable semiconductor component having a load path interconnecting said coil for energy transmission and said coil for data transmission and having a control input receiving the data signal to be transmitted.

3. The apparatus according to claim 2, wherein said at least one controllable semiconductor component includes at least two controllable semiconductor components each being connected between a respective terminal of said coil for energy transmission and a respective terminal of said coil for data transmission.

4. The apparatus according to claim 2, including at least one resistor connected in series with the load path of said at least one controllable semiconductor component.

5. The apparatus according to claim 3, including at least two resistors each being connected in series with the load path of a respective one of said at least two controllable semiconductor components.

6. The apparatus according to claim 2, wherein the load path of said at least one semiconductor component has a high impedance.

7. The apparatus according to claim 3, wherein the load paths of said at least two semiconductor components have a high impedance.

8. The apparatus according to claim 1, including at least one modulator associated with said at least one coil in said movable part for delivering a rectified operating voltage being modulated with an energy signal blanked out of the data signal, to said at least one coil in said movable part for data transmission.

9. The apparatus according to claim 8, wherein said at least one rectifier means include:
   two series-connected diodes having interconnected cathodes with a node point therebetween;
   first and second MOS transistors having load paths connected in a series connection with a node point therebetween, said series connection of said MOS transistors being connected parallel to said series-connected diodes; and
   said series connection of said MOS transistors having a first terminal connected to said first MOS transistor and a second terminal connected to said second MOS transistor, said first MOS transistor having a gate terminal connected to said second terminal and said second MOS transistor having a gate terminal connected to said first terminal;
   the node points being connected to said at least one charge capacitor carrying the operating voltage; and
   said at least one modulator includes:
   an OR gate having a first input receiving the data signal, a second input receiving the energy signal decoupled from said energy transmission coil, and an output; and
   an MOS transistor having a control input connected to the output of said OR gate and a load path connected parallel to one of said two diodes of said rectifier means.

10. The apparatus according to claim 1, wherein said at least one rectifier means has at least one output, and including an MOS transistor having a load path connected between said at least one charge capacitor and the at least one output of said at least one rectifier means.

11. The apparatus according to claim 8, wherein:
    said at least one rectifier means has inputs and outputs; and
    said at least one modulator includes:
    four semiconductor switching elements having load paths and control terminals;
    the load paths of two of said four semiconductor switching elements being connected in a first series circuit having a node point between said semiconductor switching elements and having terminals, and the load paths of the other two of said four semiconductor switching elements being connected in a second series circuit having a node point between said semiconductor switching elements and having terminals;
    each of the node points of said series circuits being connected to a respective one of the inputs of said rectifier means;
    resistors each being connected between a respective one of the outputs of said rectifier means and a respective one of the terminals of said series circuits;

a non-inverted control signal and an inverted control signal being delivered in alternation to the control terminals of said semiconductor switching elements of said first series circuit, the inverted control signal and the non-inverted control signal being delivered to the control terminals of said semiconductor switching elements of said second series circuit, and said coil for data transmission being acted upon in alternation with a positive and a negative voltage at said at least one charge capacitor.

12. The apparatus according to claim 6, wherein:

said at least one rectifier means has inputs and outputs; and said at least one modulator includes:

four semiconductor switching elements having control terminals;

two of said four semiconductor switching elements being connected in a first series circuit having a node point between said two semiconductor switching elements and having terminals, and the other two of said four semiconductor switching elements being connected in a second series circuit having a node point between said other two semiconductor switching elements and having terminals;

two capacitors each being connected between a respective one of the node points of said series circuits and a respective one of the inputs of said rectifier means;

one of the terminals of each of said series circuits being connected to a respective one of the outputs of said rectifier means;

a non-inverted control signal and an inverted control signal being delivered in alternation to the control terminals of said semiconductor switching elements of said first series circuit, the inverted control signal and the non-inverted control signal being delivered to the control terminals of said semiconductor switching elements of said second series circuit, and said coil for data transmission being acted upon in alternation with a positive and a negative voltage at said at least one charge capacitor.

13. The apparatus according to claim 7, wherein:

said at least one rectifier means has inputs and outputs; and said at least one modulator includes:

four semiconductor switching elements having control terminals;

two of said four semiconductor switching elements being connected in a first series circuit having a node point between said two semiconductor switching elements and having terminals, and the other two of said four semiconductor switching elements being connected in a second series circuit having a node point between said other two semiconductor switching elements and having terminals;

two capacitors each being connected between a respective one of the node points of said series circuits and a respective one of the inputs of said rectifier means;

one of the terminals of each of said series circuits being connected to a respective one of the outputs of said rectifier means;

a non-inverted control signal and an inverted control signal being delivered in alternation to the control terminals of said semiconductor switching elements of said first series circuit, the inverted control signal and the non-inverted control signal being delivered to the control terminals of said semiconductor switching elements of said second series circuit, and said coil for data transmission being acted upon in alternation with a positive and a negative voltage at said at least one charge capacitor.

14. The apparatus according to claim 6, wherein:

said at least one rectifier means first and second inputs and first and second outputs; and said at least one modulator includes:

first and second reversing switched semiconductor switching elements having load paths and first and second reversing switch terminals;

capacitors each being connected between the first output of said rectifier means and the load path of a respective one of said semiconductor switching elements;

each of the first reversing switch terminals of said semiconductor switching elements being connected to the input of a respective one of said rectifier means, and the second reversing switch terminals of each of said semiconductor switching elements being connected to the second output of said rectifier means;

a third reversing switch semiconductor switching element having reversing terminals, a neutral middle position, and a load path;

the load path of said third semiconductor switching element being connected to the first output of said rectifier means; and the reversing terminals of said third semiconductor switching element each being connected to a respective one of the inputs of said rectifier means.

15. The apparatus according to claim 7, wherein:

said at least one rectifier means first and second inputs and first and second outputs; and said at least one modulator includes:

first and second reversing switched semiconductor switching elements having load paths and first and second reversing switch terminals;

capacitors each being connected between the first output of said rectifier means and the load path of a respective one of said semiconductor switching elements;

each of the first reversing switch terminals of said semiconductor switching elements being connected to the input of a respective one of said rectifier means, and the second reversing switch terminals of each of said semiconductor switching elements being connected to the second output of said rectifier means;

a third reversing switch semiconductor switching element having reversing terminals, a neutral middle position, and a load path;

the load path of said third semiconductor switching element being connected to the first output of said rectifier means; and the reversing terminals of said third semiconductor switching element each being connected to a respective one of the inputs of said rectifier means.

* * * * *